E. S. ZIEGLER.
WINDSHIELD HINGE.
APPLICATION FILED NOV. 14, 1919.
1,344,844. Patented June 29, 1920.
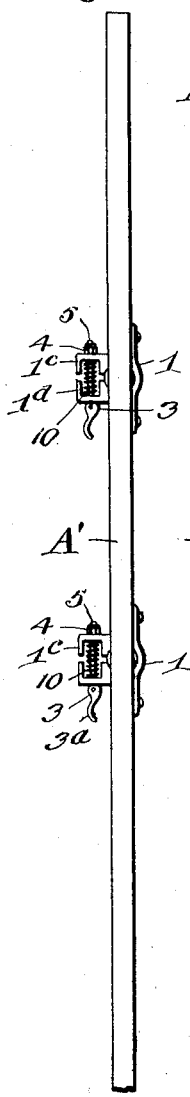
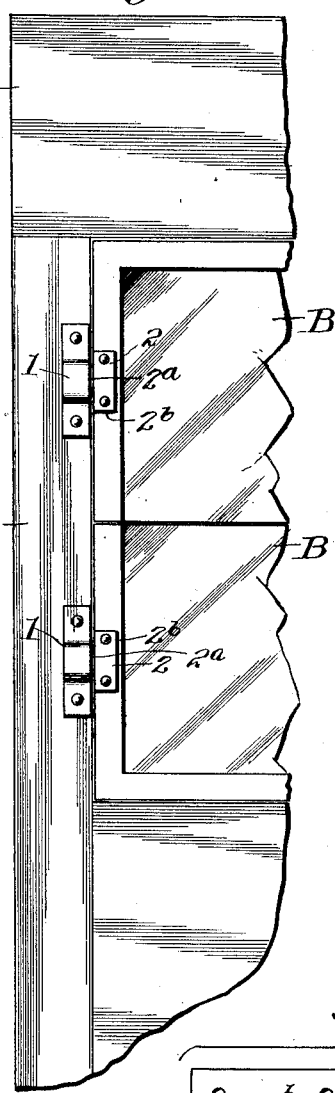
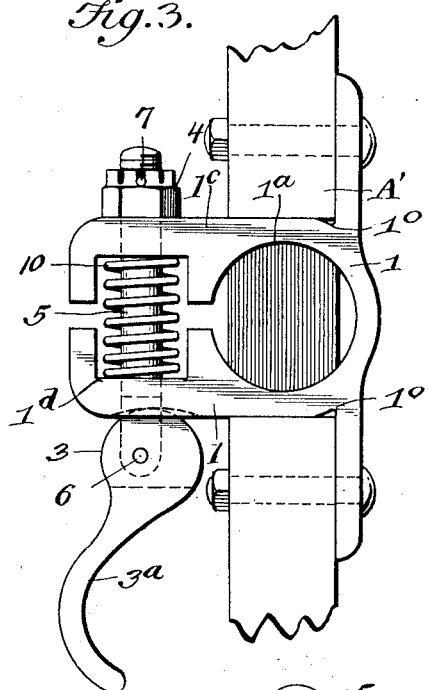
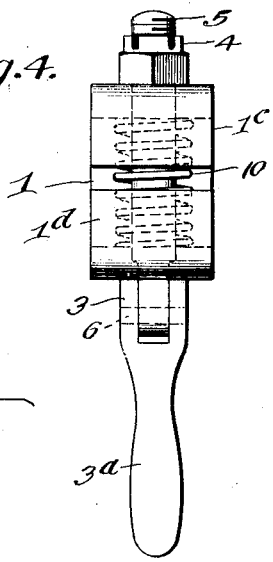
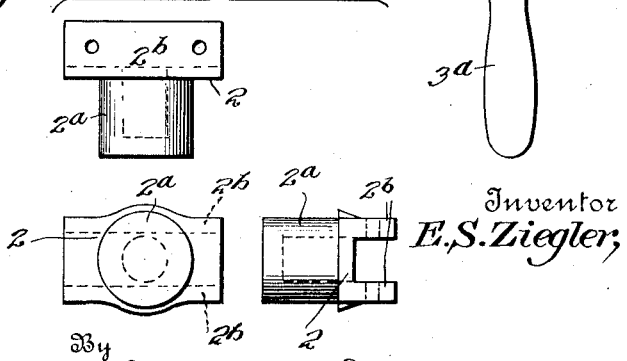
Inventor
E. S. Ziegler;
By
Spear Middleton Donaldson Hall Attorney

UNITED STATES PATENT OFFICE.

EDWIN S. ZIEGLER, OF YORK, PENNSYLVANIA.

WINDSHIELD-HINGE.

1,344,844.  Specification of Letters Patent.  Patented June 29, 1920.

Application filed November 14, 1919. Serial No. 337,984.

*To all whom it may concern:*

Be it known that I, EDWIN S. ZIEGLER, a citizen of the United States, and resident of York, Pennsylvania, have invented certain new and useful Improvements in Windshield-Hinges, of which the following is a specification.

My present invention relates to improvements in wind shields of the ventilating type and aims to provide means by which the pivoted wind shield section may be normally held securely locked in position and yet be quickly and easily freed or released for adjustment.

The invention also aims to provide means by which such frictional engagement may be adjusted without altering or affecting the positive holding action.

I have aimed to embody these features in a wind shield in which the movable sections will have their pivots disposed centrally of the plane of the standards or supporting frame so that when the wind shield section or sections are in a vertical plane or closed, there will be a minimum clearance between their adjacent transverse edges, or between their edges and stationary parts, without liability of binding in the adjusting of the section or sections.

With these and other objects in view the invention includes the novel features of construction and arrangement and combination of parts hereinafter described and particularly defined by the appended claim.

An embodiment of my invention is illustrated in the accompanying drawings, in which—

Figure 1 is a rear elevation of a portion of a wind shield and frame embodying my invention.

Fig. 2 is an edge view of the same.

Fig. 3 is an enlarged view of one of the connections as seen when looking toward the left, Fig. 1.

Fig. 4, a view at right angles to Fig. 1 with the standard or frame omitted, and Fig. 5 is a detail view of the bracket of the wind shield or glass frame section.

Referring by reference characters to this drawing, the letter A designates the frame or stationary part of the wind shield which in the present instance is shown as of the wooden type used in cars having closed in bodies, such frame having a rectangular opening in which the wind shield sections or glass carrying frames are mounted. In some types the lower section is made rigid or immovable and the upper section adjustable, while in other types both are made adjustable, and it is the latter form which I have chosen as embodying my invention, illustrating two movable wind shield sections which are designated at B and B' respectively and both of which are pivotally supported from the side standards or frame parts A' only one of which is shown in the drawings for convenience.

For pivotally connecting these wind shield sections to the standards I provide at each end of each section a hinge pintle $2^a$ which is preferably formed integral with a bracket member 2 having spaced lugs $2^b$ adapted to embrace the glass holding frame between them and be secured thereto by any suitable means, such for instance as rivets or screws.

Each hinge pintle engages a bearing recess $1^a$ in a bracket member 1, which is mortised into the inner edge of the standard A' and is provided with face flange members designed to be secured to the rear face of the standard by means such as screws or bolts.

The bearing bracket on the side opposite the flange members is split transversely to provide two arms $1^c$ and $1^d$ and the metal of the bracket around the pintle opening is of such thickness as to allow these arms to have a certain amount of resiliency. This may be increased or secured by slightly recessing the parts as indicated at $1^e$.

The arms are provided with vertically alined openings through which is passed a bolt 5 upon the upper end of which is threaded an adjusting nut 4, which may be locked in position by a key or cotter pin 7, passing through an opening in the bolt and engaging recesses in the nut.

On the lower end of the bolt is pivotally mounted a cam or eccentric 3 conveniently by having the eccentric bifurcated and straddling the flattened end of the bolt to which is connected by the pivot pin 6, the eccentric being provided with an operating handle or finger piece $3^a$. The portion of the bolt lying between the arms is encircled by a spring 10 which bears at its upper and lower ends against the upper and lower arms respectively and tends to force them apart. This spring constitutes a positive means for separating the arms and freeing the hinge pintle in case of rusting or a lack of lubricant.

In the assembling of the parts it will be understood that the nut 4 will be so adjusted that when the cam handle 3ª is swung to the left the Fig. 3 pressure through the arms on the pintle 1ª will be released sufficiently to allow the corresponding wind shield section to be swung on the pivot, but sufficient friction will be maintained to prevent too free a movement, and this friction may be accurately adjusted or determined by adjusting the nut 4.

When the section is to be locked, the cam handle is pressed toward the frame which forces the arms toward each other against the tension of the spring and securely binds the hinge pintle.

Having thus described my invention, what I claim is—

In combination, a wind shield standard, a bearing member mortised into said frame and having securing lugs bearing against the front face of said standard and secured thereto, said bearing member having a bearing recess located in the plane of said standard and having a split portion provided with spaced arms projecting rearwardly from the standard, a bolt passing through said arms having means at one end for adjustably connecting it to one of the arms, a spring encircling the bolt between said arms, and a lever pivotally connected to the opposite end of the bolt and having a cam portion bearing in a recess in the other arm.

In testimony whereof, I affix my signature.

EDWIN S. ZIEGLER.